(12) United States Patent
Jin et al.

(10) Patent No.: US 10,416,956 B2
(45) Date of Patent: Sep. 17, 2019

(54) DISPLAY APPARATUS AND METHOD OF CONTROLLING THE SAME

(71) Applicant: SAMSUNG ELECTRONICS CO., LTD., Suwon-si (KR)

(72) Inventors: Jang-ho Jin, Hwaseong-si (KR); Young-jun Ryu, Suwon-si (KR); Ho-gun Lim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/724,781

(22) Filed: Oct. 4, 2017

(65) Prior Publication Data

US 2018/0113674 A1 Apr. 26, 2018

(30) Foreign Application Priority Data

Oct. 20, 2016 (KR) .......................... 10-2016-0136577

(51) Int. Cl.
*G10L 15/00* (2013.01)
*G06F 3/16* (2006.01)
*G10L 15/22* (2006.01)

(52) U.S. Cl.
CPC .............. *G06F 3/167* (2013.01); *G10L 15/22* (2013.01); *G10L 2015/223* (2013.01)

(58) Field of Classification Search
CPC ........ G10L 15/22; G10L 15/265; G06F 3/167; H04M 2201/40
USPC .................................. 704/231–257, 270–275
See application file for complete search history.

(56) References Cited

U.S. PATENT DOCUMENTS

| 6,499,016 | B1* | 12/2002 | Anderson | G06F 17/30781 |
| | | | | 704/275 |
| 6,622,119 | B1* | 9/2003 | Ramaswamy | G06F 17/279 |
| | | | | 704/9 |
| 6,993,486 | B2* | 1/2006 | Shimakawa | G06F 3/16 |
| | | | | 704/275 |
| 7,349,845 | B2* | 3/2008 | Coffman | G06F 17/2818 |
| | | | | 704/257 |
| 9,734,839 | B1* | 8/2017 | Adams | G10L 21/00 |
| 2013/0275164 | A1 | 10/2013 | Gruber et al. | |

(Continued)

FOREIGN PATENT DOCUMENTS

| EP | 3010015 A1 | 4/2016 |
| KR | 10-2014-0139922 A | 12/2014 |

(Continued)

OTHER PUBLICATIONS

Communication dated Mar. 21, 2018, issued by the European Patent Office in counterpart European Application No. 17194879.7.

*Primary Examiner* — Jesse S Pullias

(74) *Attorney, Agent, or Firm* — Sughrue Mion, PLLC

(57) ABSTRACT

A display apparatus controlled based on a user's uttered voice and a method of controlling a display apparatus based on a user's uttered voice are provided. A display apparatus includes a processor, a memory, and a display. The processor is configured to receive an uttered voice of a user, determine text corresponding to the uttered voice of the user as an intermediate recognition result, determine a command based on a result obtained by comparing the intermediate recognition result with a previous intermediate recognition result that is stored in the memory, and perform an operation according to the command.

18 Claims, 11 Drawing Sheets

(56) References Cited

U.S. PATENT DOCUMENTS

2014/0337370 A1    11/2014  Aravamudan et al.
2016/0351190 A1*   12/2016  Piernot .................. G10L 15/22
2017/0110116 A1*   4/2017   Tadpatrikar ............ G10L 15/05

FOREIGN PATENT DOCUMENTS

KR         10-1566254 B1    11/2015
KR     10-2016-0084724 A     7/2016

* cited by examiner

DISPLAY APPARATUS AND METHOD OF CONTROLLING THE SAME

CROSS-REFERENCE TO RELATED APPLICATION

This application claims priority from Korean Patent Application No. 10-2016-0136577, filed on Oct. 20, 2016 in the Korean Intellectual Property Office, the disclosure of which is incorporated herein in its entirety by reference.

BACKGROUND

1. Field

Methods and apparatus consistent with exemplary embodiments relate to display apparatuses and methods of controlling the same, and more particularly, to display apparatuses controlled based on a user's uttered voice and methods of controlling display apparatuses based on a user's uttered voice.

2. Related Art

With the development of voice recognition technology, techniques for recognizing a user's uttered voice in order to control a display apparatus have been widely used.

A display apparatus may receive a user's uttered voice and may convert the user's uttered voice into text. For example, the display apparatus may convert the user's uttered voice into text in real time while receiving the user's uttered voice. In this case, the display apparatus may notify the user that his/her uttered voice is being converted into text in real time by displaying the text converted from the user's uttered voice in real time.

A voice recognition function of a display apparatus starts and ends according to a user input. For example, a user may start a voice recognition function by providing an input to the display apparatus by using a control device such as a remote controller. After the user finishes speaking, the user may terminate the voice recognition function by using the control device. Thereafter, the display apparatus may execute a function according to the user's uttered voice.

Sometimes, however, a user repeatedly utters a command to execute a function such as moving a cursor on a screen of a display apparatus, changing a channel, or changing a volume. In this case, in the related art, each time the user wishes to utter a command to execute a function, the user has to inconveniently repeatedly perform an operation for starting and ending a voice recognition function by using a control device or the like.

SUMMARY

Exemplary embodiments may address at least the above problems and/or disadvantages and other disadvantages not described above. Also, exemplary embodiments are not required to overcome the disadvantages described above, and may not overcome any of the problems described above.

Exemplary embodiments provide a display apparatus that may perform an operation in real time even before an uttered voice of a user ends when an operation of the display apparatus is to be controlled based on the uttered voice of the user and a method of controlling the display apparatus.

Exemplary embodiments may also provide a display apparatus that may be easily controlled via only the uttered voice of a user even without repeated inputs for starting or ending a voice recognition function when the display apparatus repeatedly performs an operation based on the uttered voice of the user and a method of controlling the display apparatus.

Additional aspects will be set forth in part in the description which follows and, in part, will be apparent from the description, or may be learned by practice of the exemplary embodiments.

According to an aspect of an exemplary embodiment, there is provided a display apparatus including: a display, a memory, and a processor configured to receive an uttered voice of a user, determine text corresponding to the uttered voice of the user as an intermediate recognition result, determine a first command based on a result obtained by comparing the intermediate recognition result with a previous intermediate recognition result that is stored in the memory, and perform an operation according to the first command.

The processor may be further configured to determine whether new text is included in the intermediate recognition result by comparing the intermediate recognition result with the previous intermediate recognition result, and in response to the processor determining that the new text is included in the intermediate recognition result, determine a second command corresponding to the new text.

The processor may be further configured to determine whether an intention of the user corresponding to the new text exists, and in response to the processor determining that the intention of the user exists, determine the second command based on the intention of the user.

The intention of the user corresponding to the new text may be identical to an intention of the user corresponding to the previous intermediate recognition result.

In response to the processor determining the intention of the user exists, the processor may be further configured to store the intermediate recognition result in the memory.

The processor may be further configured to control the display to display a user interface corresponding to the first command. The user interface corresponding to the first command may include at least one from among the intermediate recognition result and text corresponding to the first command.

The processor may be further configured to determine whether the uttered voice of the user ends, in response to the processor determining that the uttered voice of the user ends, determine the intermediate recognition result as a final result, and perform an operation corresponding to the final result.

The processor may be further configured to determine whether the uttered voice of the user ends, and in response to the processor determining that the uttered voice of the user ends, end the receiving of the uttered voice of the user.

The first command may include any one from among a command for adjusting a position of a cursor displayed on the display, a command for adjusting a volume of a sound output interface included in the display apparatus, and a command for changing a channel of the display apparatus.

The previous intermediate recognition result stored in the memory may correspond to the uttered voice of the user received from a time when the processor receives an input to start a function for recognizing the uttered voice of the user to a time when an intention of the user is recognized.

According to an aspect of another exemplary embodiment, there is provided a method of controlling a display apparatus using an uttered voice of a user, the method including: receiving an uttered voice of a user; determining text corresponding to the received uttered voice of the user as an intermediate recognition result; determining a first command based on a result obtained by comparing the intermediate recognition result with a previous intermediate recognition result that is stored in a memory; and performing an operation according to the command.

The determining of the command may include: determining whether new text is included in the intermediate recognition result by comparing the intermediate recognition result with the previous intermediate recognition result; and in response to determining that the new text is included in the intermediate recognition result, determining a command corresponding to the new text.

The determining of the command corresponding to the new text may include: determining whether an intention of the user corresponding to the new text exists; and in response to determining that the intention of the user exists, determining a command based on the intention of the user.

The intention of the user corresponding to the new text may be identical to an intention of the user corresponding to the previous intermediate recognition result.

In response to determining that the intention of the user exists, the method may further include storing the intermediate recognition result in the memory.

The method may further include displaying a user interface corresponding to the command. The user interface corresponding to the command may include at least one from among the intermediate recognition result and text corresponding to the command.

The method may further include: determining whether the uttered voice of the user ends; in response to determining that the uttered voice of the user ends, determining the intermediate recognition result as a final result; and performing an operation corresponding to the final result.

The method may further include: determining whether the uttered voice of the user ends; and in response to determining that the uttered voice of the user ends, ending the receiving of the uttered voice of the user.

The command may include any one from among a command for adjusting a position of a cursor displayed on a display, a command for adjusting a volume of a sound output interface included in the display apparatus, and a command for changing a channel of the display apparatus.

According to an aspect of another exemplary embodiment, there is provided a non-transitory computer-readable storage medium having embodied thereon a program for executing the method.

According to an aspect of another exemplary embodiment, there is provided a method for controlling a device, the method including: receiving a first voice command from a user; storing a first text corresponding to the first voice command as a first intermediate recognition result; determining an intention of the first voice command; determining a first command corresponding to the stored first intermediate recognition result, based on the intention; receiving, after storing the first text as the first intermediate recognition result, a second voice command from the user; storing the first text and a second text corresponding to the second voice command as a second intermediate recognition result; determining a second command by comparing the stored second intermediate recognition result with the stored first intermediate recognition result, based on the intention; and performing a first operation corresponding to the first command and a second operation corresponding to the second command.

The method may further include: activating a voice control function in respond to receiving a command to activate the voice control function; and deactivating the voice control function in response to receiving a command to deactivate the activated voice control function. The first voice command and the second voice command may both be received during a period after the voice control function is activated and before the voice control function is deactivated.

The method may further include replacing the stored first intermediate recognition result with the stored second intermediate recognition result.

The method may further include displaying at least one the stored first intermediate recognition result and a third text corresponding to the first command.

The method may further include displaying at least one the stored second intermediate recognition result and a fourth text corresponding to the second command.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
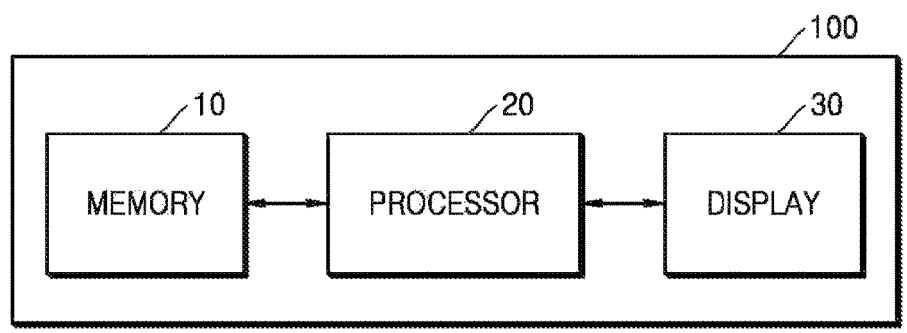
FIG. 1 is a block diagram of a display apparatus according to an exemplary embodiment.

Exemplary embodiments are described in greater detail below with reference to the accompanying drawings. Also, a method of configuring and using an electronic apparatus according to exemplary embodiments will be described in greater detail with reference to the accompanying drawings. In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the exemplary embodiments. As used herein, the term "and/or" includes any and all combinations of one or more of the associated listed items.

In addition, in the following description, "display" may refer to an element that visually outputs image data. Also, according to an exemplary embodiment, when a display panel and a touchpad included in the display have a layer structure to form a touchscreen, the display may be used as an input device in addition to an output device. The display may include at least one from among a liquid-crystal display (LCD), a thin-film-transistor liquid-crystal display, an organic light-emitting diode (OLED), a flexible display, a three-dimensional (3D) display, an electrophoretic display, a plasma display panel (PDP), a quantum dot LED (QLED).

A "display apparatus" may refer to an output device which includes the display and is capable of visually representing image data. The display apparatus may be connected to a desktop computer, a notebook computer, a tablet personal computer (PC), a camera, a mobile phone, a storage medium, or other electronic apparatuses and may receive image data by wire or wirelessly. According to an exemplary embodiment, the display apparatus may receive an analog broadcast signal or a digital broadcast signal. The display apparatus may be a flat display apparatus, a curved display apparatus including a screen with a curvature, or a flexible display apparatus whose curvature may be adjusted. Also, the display apparatus may include a PC monitor and a TV monitor, and may include a commercial display (e.g., a large format display (LFD)). Also, the display apparatus may include two or more displays.

A portion of the display of the display apparatus on which actual contact is output may be referred to as a screen.

Also, a "user" may refer to a person who controls a function or an operation of the display apparatus and may include a manager or an installation manager.

The terminology used herein is for the purpose of describing exemplary embodiments only and is not intended to be limiting of exemplary embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof, but do not preclude the presence or addition of one or more other features, integers, steps, operations, elements, components, and/or groups thereof.

As used herein, expressions such as "at least one of," when preceding a list of elements, modify the entire list of elements and do not modify the individual elements of the list.

FIG. 1 is a block diagram of a display apparatus 100 according to an exemplary embodiment.

The display apparatus 100 of FIG. 1 may receive an uttered voice of a user and may perform an operation corresponding to the uttered voice of the user.

Examples of the display apparatus 100 may include, but are not limited to, a smart TV, a smartphone, a network soundbar, a head-mounted display (HMD), a head-up display (HUD), a wearable device, a tablet PC, a PC, a laptop computer, a global positioning system (GPS), a digital broadcasting terminal, a navigation system, a kiosk, a digital camera, and other mobile or non-mobile computing devices. Also, the display apparatus 100 may be a virtual reality (VR) device for providing a VR image having a communication function and a data processing function, an augmented reality (AR) device for providing an AR image, a clock, glasses, a hair band, or a ring.

The display apparatus 100 may display text corresponding to an uttered voice of the user that is received in real time. Accordingly, the display apparatus 100 may notify the user that a voice uttered by the user is being converted into text in real time.

For example, the display apparatus 100 may display an intermediate recognition result even before a final result is obtained. Also, the display apparatus 100 may display text corresponding to a command according to the intermediate recognition result even before the final result is obtained.

The term "final result" refers to the entire text corresponding to the uttered voice of the user obtained by the display apparatus 100 during a period from a time when the uttered voice of the user starts to a time when the uttered voice of the user ends. When the uttered voice of the user ends, the display apparatus 100 may display the final result.

The term "intermediate recognition result" refers to text corresponding an uttered voice of the user obtained by the display apparatus 100 during a period from a time when the uttered voice starts to an arbitrary time before a final result is obtained. The intermediate recognition result may correspond to an uttered voice of the user received from a time when the display apparatus 100 starts a function of recognizing an uttered voice of the user to an arbitrary time.

For example, when the user utters "Find Infinite Challenge," a final result may be "Find Infinite Challenge." Also, an intermediate recognition result may include "Infinite" and "Infinite Challenge."

For example, when "Infinite" and "Infinite Challenge" that are included in the intermediate recognition result are obtained before the final result corresponding to the expression "Find Infinite Challenge" uttered by the user is obtained, text including "Infinite" and "Infinite Challenge" may be displayed.

Referring to FIG. 1, the display apparatus 100 includes a memory 10, a processor 20, and a display 30.

The memory 10 according to an exemplary embodiment may store various data, programs, or applications for driving and controlling the display apparatus 100. Each of the programs stored in the memory 10 may include one or more instructions. The programs (the one or more instructions) or the applications stored in the memory 10 may be executed by the processor 20.

For example, a program for determining a command based on an uttered voice of the user may be stored in the memory 10 of the display apparatus 100 or may be separately stored in an external device.

The memory 10 according to an exemplary embodiment may store a previous intermediate recognition result.

The term "previous intermediate recognition result" refers to an uttered voice of the user received from a time when the display apparatus 100 starts a function for recognizing the uttered voice of the user. For example, the previous intermediate recognition result may correspond to an uttered voice of the user received from a time when the processor 20 receives an input that starts a function for recognizing the uttered voice of the user.

Also, an intermediate recognition result stored in the memory 10 may correspond to an uttered voice of the user received from a time when the processor 20 receives an input that starts a function for recognizing the uttered voice of the user to a time when an intention of the user is recognized.

The processor 20 according to an exemplary embodiment may execute one or more programs stored in the memory 10. The processor 20 may include a single-core, a dual-core, a triple-core, a quad-core, and a multiple core thereof. Also, the processor 20 may include a plurality of processors.

The processor 20 may receive an uttered voice of the user. The uttered voice of the user may be directly received from an audio input interface included in the display apparatus 100 or may be received as a voice signal received through a communicator. Hereinafter, the term "uttered voice of the user" refers to a voice signal corresponding to the uttered voice of the user.

The processor 20 may determine text corresponding to the received uttered voice of the user as an intermediate recognition result.

The processor 20 may control the intermediate recognition result to be displayed on the display 30. For example, the processor 20 may display the intermediate recognition result according to an utterance speed of the user on the display 30, thereby giving the user the impression that his/her utterance is being recognized in real time.

The processor 20 may determine a command based on a result obtained by comparing the determined intermediate recognition result with a previous intermediate recognition result that was previously stored.

For example, the processor 20 may determine whether new text is included in the determined intermediate recognition result by comparing the determined intermediate recognition result with the previous intermediate recognition result. The processor 20 may determine a command corresponding to the new text when it is determined that the new text is included in the determined intermediate recognition result.

For example, when the determined intermediate recognition result is "Channel up up" and the previous intermediate recognition result is "Channel up," the processor 20 may determine that new text including "up" is included in the determined intermediate recognition result. Accordingly, the processor 20 may determine a command corresponding to the new text including "up."

Also, the processor 20 may determine whether an intention of the user corresponding to the new text exists.

When the processor 20 determines that the intention of the user corresponding to the new text exists, the processor 20 may determine a command based on the intention of the user corresponding to the new text. The intention of the user corresponding to the new text may be identical to an intention of the user corresponding to the previous intermediate recognition result.

For example, when the new text is "up," an intention of the user corresponding to the new text may be identical to an intention of the user corresponding to "Channel up" that is the previous intermediate recognition result.

The processor 20 may perform an operation corresponding to the determined command. For example, the determined command may be the repetition of a command corresponding to the previous intermediate recognition result.

When the processor 20 determines that the intention of the user exists, the processor 20 may store the determined intermediate recognition result in the memory 10.

The processor 20 may determine whether the uttered voice of the user ends. When the processor 20 determines that the uttered voice of the user ends, the processor 20 may determine the determined intermediate recognition result as a final result, and may perform an operation corresponding to the final result.

When it is determined that the uttered voice of the user ends, the processor 20 may end a voice recognition function. For example, when it is determined that the uttered voice of the user ends, the processor 20 may end the receiving of the uttered voice of the user.

For example, the processor 20 may determine that the uttered voice of the user ends based on an input from a control device. The user may provide an input for starting the uttered voice and an input for ending the uttered voice through the control device. The control device may include, for example, a remote controller.

The display 30 may display a user interface corresponding to the command determined by the processor 20. For example, the user interface corresponding to the determined command may include at least one of the intermediate recognition result and text corresponding to the determined command.

For example, the display 30 may display the intermediate recognition result under the control of the processor 20. Also, the display 30 may display text corresponding to a command determined based on a result obtained by comparing the intermediate recognition result determined by the processor 20 and the previous recognition result that was previously stored.

For example, the determined command may include any one from among a command for adjusting a position of a cursor displayed on the display 30, a command for adjusting a volume of a sound output interface included in the display apparatus 100, a command for changing a channel of the display apparatus 100, etc. Also, the determined command may include a command for executing or searching for content.

Figure 2:
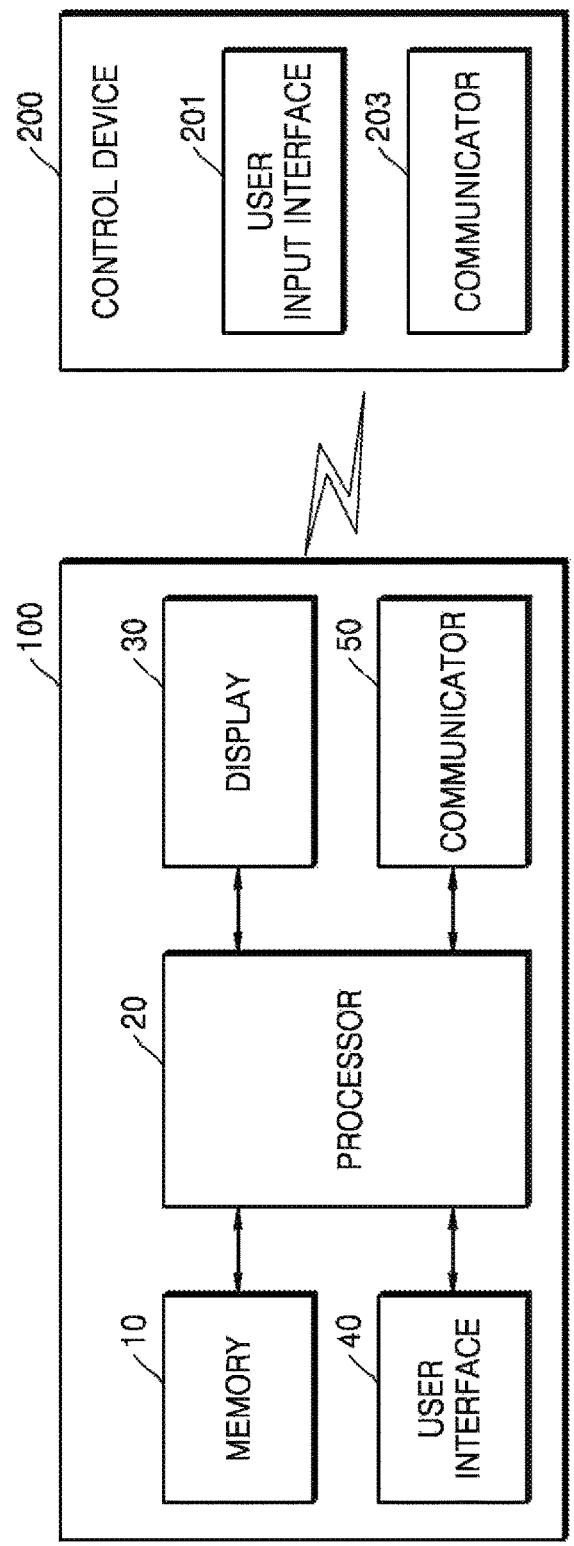
FIG. 2 is a block diagram of the display apparatus and a control device wirelessly connected to the display apparatus according to an exemplary embodiment.

FIG. 2 is a block diagram of the display apparatus 100 and a control device 200 wirelessly connected to the display apparatus 100 according to an exemplary embodiment.

Referring to FIG. 2, the display apparatus 100 includes the memory 10, the processor 20, the display 30, a user input interface 40, and a communicator 50 (e.g., a communication interface). The memory 10, the processor 20, and the display 30 have been described above with reference to FIG. 1, and thus a repeated explanation thereof will not be given.

The user input interface 40 of FIG. 2 may include an audio input interface to receive an uttered voice of a user. The audio input interface receives an external sound signal and converts the external sound signal into electrical voice data. For example, the audio input interface may receive a sound signal from an external device or a speaker. The audio input interface may transmit voice data in units of frames to the processor 20.

The processor 20 according to an exemplary embodiment may convert the voice data received in units of frames from the user input 40 into text. Also, the processor 20 may determine a command based on the text.

According to an exemplary embodiment, the processor 20 may transmit the voice data received in units of frames from the user input interface 40 to an external device. The external device may convert the voice data in units of frames into text. Also, the external device may determine a command based on the text. In this case, the processor 20 may receive the text from the external device and may receive the command determined by the external device.

For example, the external device may include a server that is connected to the display apparatus 100 by a wire or wirelessly.

The communicator 50 may include a transceiver that can transmit/receive data and signals to/from the control device 200 or the external device under the control of the processor 20.

The control device 200 of FIG. 2 is a device for controlling a function of the display apparatus 100. The control device 200 may be, for example, but is not limited to, a remote controller, and includes an electronic device for controlling a function of the display apparatus 100, for example, a smartphone or a tablet PC.

Referring to FIG. 2, the control device 200 may include a user input interface 201 and a communicator 203.

The user input interface 201 according to an exemplary embodiment may receive a user input.

The control device 200 may control a function of the display apparatus 100 based on the user input received through the user input interface 201.

The user input according to an exemplary embodiment may include an input for starting voice utterance of the user and an input for ending the voice utterance of the user. For example, the input for starting the voice utterance of the user may be an input for executing a voice recognition mode of the control device 200. Also, the input for ending the voice utterance of the user may be an input for ending the voice recognition mode of the control device 200.

Also, the user input may include voice utterance of the user for controlling the display apparatus 100.

For example, the user input interface 201 may include at least one from among a key (including a button), a touchpad, a microphone for receiving an uttered voice of the user, and a sensor for recognizing a motion of the control device 200.

The communicator 203 according to an exemplary embodiment may transmit/receive a signal to/from the display apparatus 100.

The communicator 203 may transmit/receive a signal to/from the display apparatus 100 by using short-range communication including, for example, infrared or Bluetooth communication.

Figure 3:
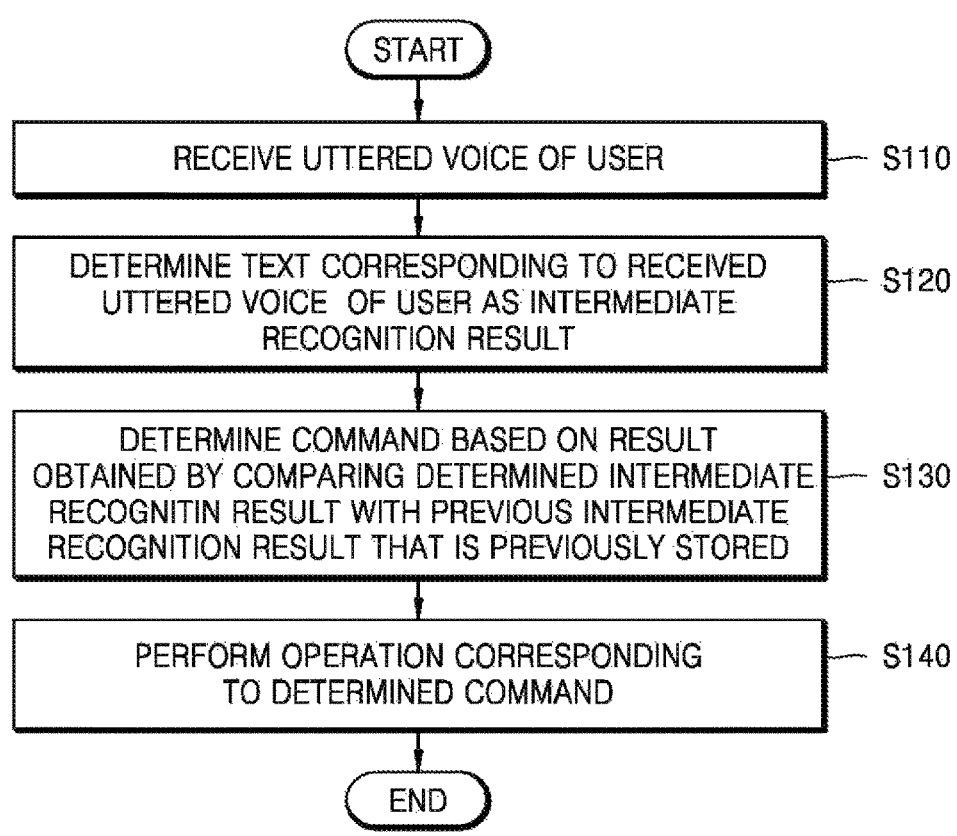
FIG. 3 is a flowchart of a method of controlling the display apparatus according to an exemplary embodiment.

FIG. 3 is a flowchart of a method of controlling the display apparatus 100 according to an exemplary embodiment.

In operation S110, the display apparatus 100 may receive an uttered voice of a user.

In operation S120, the display apparatus 100 may determine text corresponding to the received uttered voice of the user as an intermediate recognition result.

In operation S130, the display apparatus 100 may determine a command based on a result obtained by comparing the determined intermediate recognition result with a previous intermediate recognition result that was previously stored.

In operation S140, the display apparatus 100 may perform an operation corresponding to the determined command.

Figure 4:
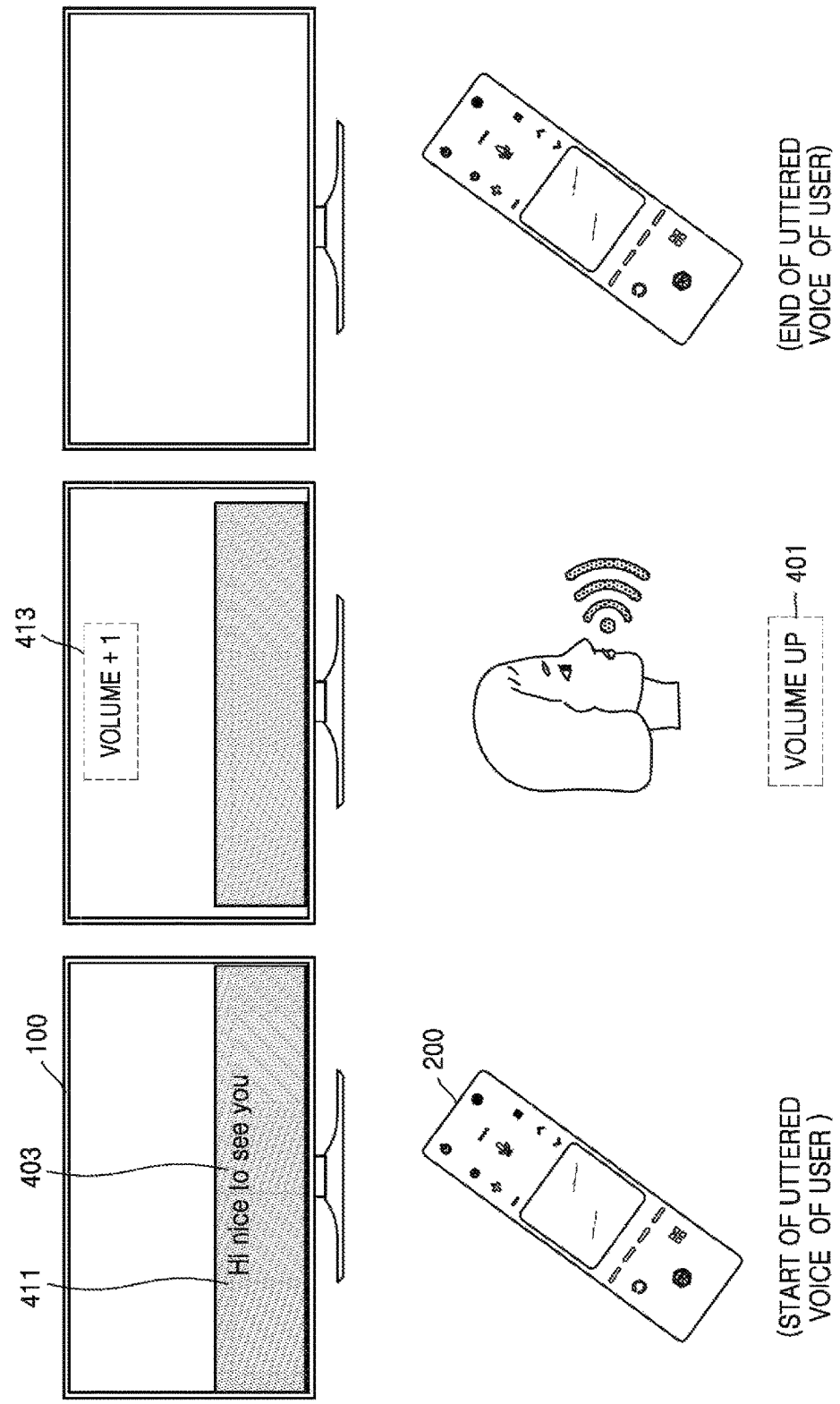
FIG. 4 is a diagram illustrating an example of the display apparatus performing an operation corresponding to an uttered voice of a user according to an exemplary embodiment.

FIG. 4 is a diagram illustrating an example of the display apparatus 100 performing an operation corresponding to an uttered voice of a user according to an exemplary embodiment.

FIG. 4 illustrates a case where a volume of a sound output interface included in the display apparatus 100 is to be adjusted by 1 unit.

The display apparatus 100 may receive an input for starting voice utterance of a user through the control device 200. For example, the input for starting the voice utterance of the user may be an input for executing a voice recognition mode of at least one of the display apparatus 100 and the control device 200.

When the voice recognition mode of the at least one of the display apparatus 100 and the control device 200 starts, as shown in FIG. 4, the display apparatus 100 may display a user interface 411 on a screen.

The user interface 411 may include an object (e.g., image text or an icon) for interacting with the user. For example, the display apparatus 100 may include the user interface 411 for notifying that the utterance of the user is recognized.

For example, when the display apparatus 100 recognizes that the voice utterance of the user starts, the display apparatus 100 may display the user interface 411 including text 403 saying "Hi nice to see you."

When a voice recognition mode of at least one of the display apparatus 100 and the control device 200 starts, at least one from among the user input interface 40 (see FIG. 2) included in the display apparatus 100 and the user input interface 201 (see FIG. 2) of the control device 200 may receive an uttered voice of the user.

For example, as shown in FIG. 4, the display apparatus 100 may receive an uttered voice of the user corresponding to "Volume up."

The display apparatus 100 may determine text 401 corresponding to the received uttered voice of the user as an intermediate recognition result.

The display apparatus 100 may determine a command based on a result obtained by comparing the determined intermediate recognition result with a previous intermediate recognition result that was previously stored. If the previous intermediate recognition result that was previously stored does not exist, the display apparatus 100 may determine a command based on the text 401 corresponding to the determined intermediate recognition result.

The display apparatus 100 may perform an operation corresponding to the determined command. For example, the determined command may be a command for adjusting a volume of the sound output interface included in the display apparatus 100 by 1.

The display apparatus 100 may display at least one from among the text 401 and text 413 corresponding to the determined command.

After the display apparatus 100 performs an operation corresponding to the determined command, the display apparatus 100 may receive an input for ending the utterance of the user through the control device 200. For example, the input for ending the voice utterance of the user may be an input for ending the voice recognition mode of the at least one of the display apparatus 100 and the control device 200.

When the display apparatus 100 receives the input for ending the voice utterance of the user, the display apparatus 100 may not display the user interface 411.

Figure 5:
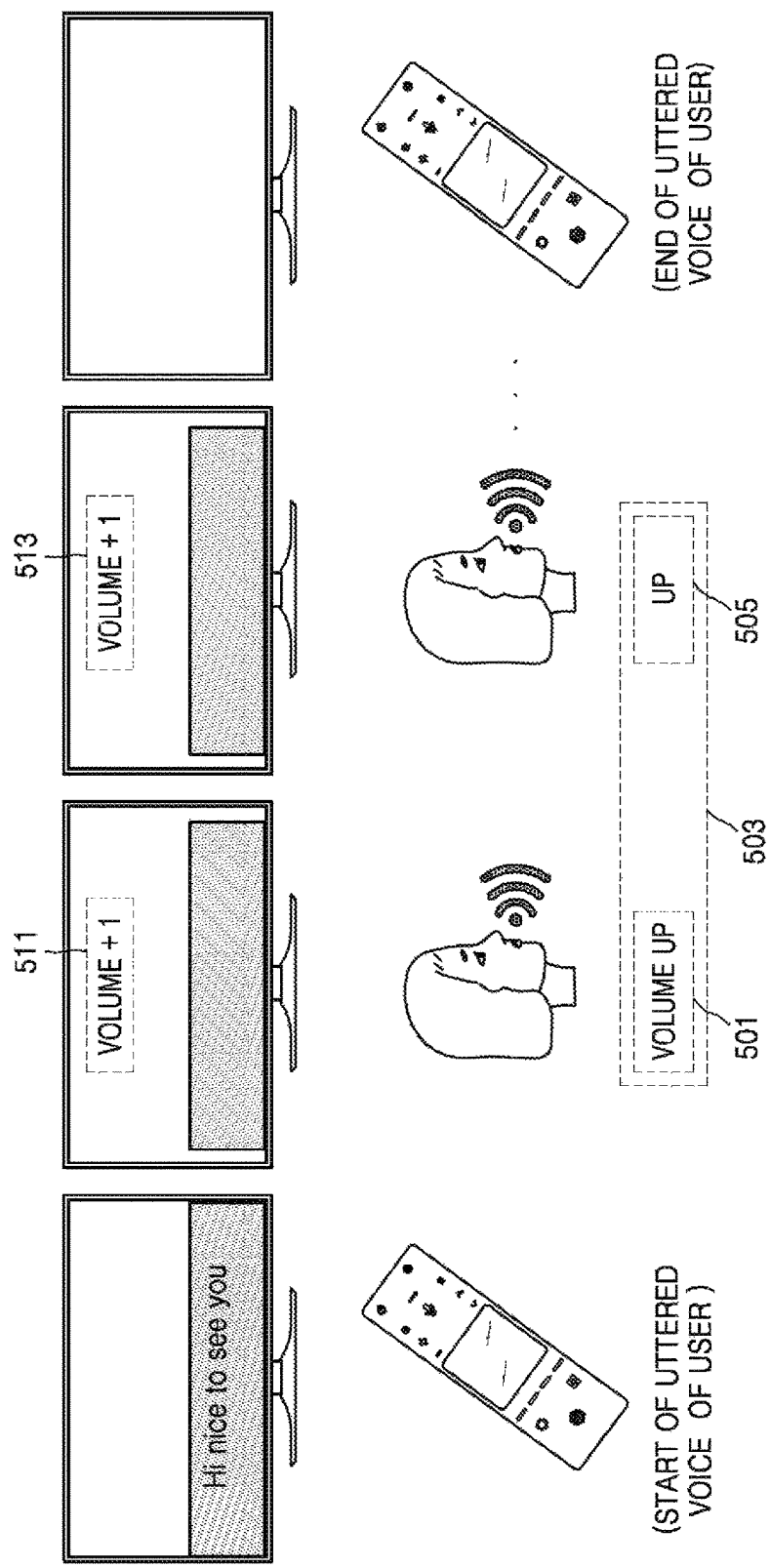
FIG. 5 is a diagram illustrating an example of the display apparatus performing an operation corresponding to an uttered voice of a user according to an exemplary embodiment.

FIG. 5 is a diagram illustrating an example of the display apparatus 100 performing an operation corresponding to an uttered voice of a user according to an exemplary embodiment.

FIG. 5 illustrates a case where a user repeatedly performs an operation of adjusting a volume of a sound output interface included in the display apparatus 100.

For example, the display apparatus 100 may receive an uttered voice of a user corresponding to "Volume up."

The display apparatus 100 may determine first text 501 corresponding to the received utterance of the user as an intermediate recognition result. Also, the display apparatus 100 may determine an instruction for adjusting a volume of the sound output interface included in the display apparatus 100 by 1 unit as a command, based on the intermediate recognition result.

Referring to FIG. 5, the display apparatus 100 may display at least one from among the first text 501 and text 511 corresponding to the determined command. Also, the display apparatus 100 may adjust a volume of the sound output interface included in the display apparatus 100 by 1 unit according to the determined command.

The display apparatus 100 may store the first text 501 that is the determined intermediate recognition result in a memory included in the display apparatus 100 or a memory of an external device.

Next, the display apparatus 100 may additionally receive an uttered voice of the user corresponding to "up."

The display apparatus 100 may determine second text 503 corresponding to the received uttered voice of the user as an intermediate recognition result. For example, the display apparatus 100 may determine "Volume up up" as an intermediate recognition result.

The display apparatus 100 may determine whether new text 505 is included in the determined intermediate recognition result by comparing the determined intermediate recognition result with the intermediate recognition result that was previously stored.

For example, the intermediate recognition result that was previously stored may be "Volume up" that is the first text 501. The determined intermediate recognition result may be "Volume up up" that is the second text 503. In this case, the display apparatus 100 may determine that "up" that is the new text 505 is included in the determined intermediate recognition result.

When the new text 505 is "up," the display apparatus 100 may determine a command corresponding to the new text 505 based on "Volume up" that is the intermediate recognition result that was previously stored, that is, the first text 501.

The display apparatus 100 may display at least one from among the second text 503 and text 513 corresponding to the determined command. Also, the display apparatus 100 may additionally adjust a volume of the sound output interface included in the display apparatus 100 by 1 unit according to the command corresponding to the new text 505.

The display apparatus 100 may repeatedly receive the uttered voice of the user corresponding to "up." In this case, the display apparatus 100 may repeatedly determine a command based on a result obtained by comparing the determined intermediate recognition result with the intermediate recognition result that was previously stored. Also, the display apparatus 100 may repeatedly determine a command based on a result obtained by comparing the determined intermediate recognition result with the intermediate recognition result that was previously stored until the uttered voice of the user ends.

According to the display apparatus 100 of FIG. 5 according to an exemplary embodiment, the user does not need to repeatedly provide an input for starting and ending voice utterance through a control device. Also, when the display apparatus 100 of FIG. 5 repeatedly performs a function, the display apparatus 100 does not need to repeatedly generate and remove a user interface for notifying that uttered voice of the user starts. Accordingly, since the display apparatus 100 only needs to display a user interface corresponding to a command, a process of the display apparatus 100 may be simplified.

Figure 6:
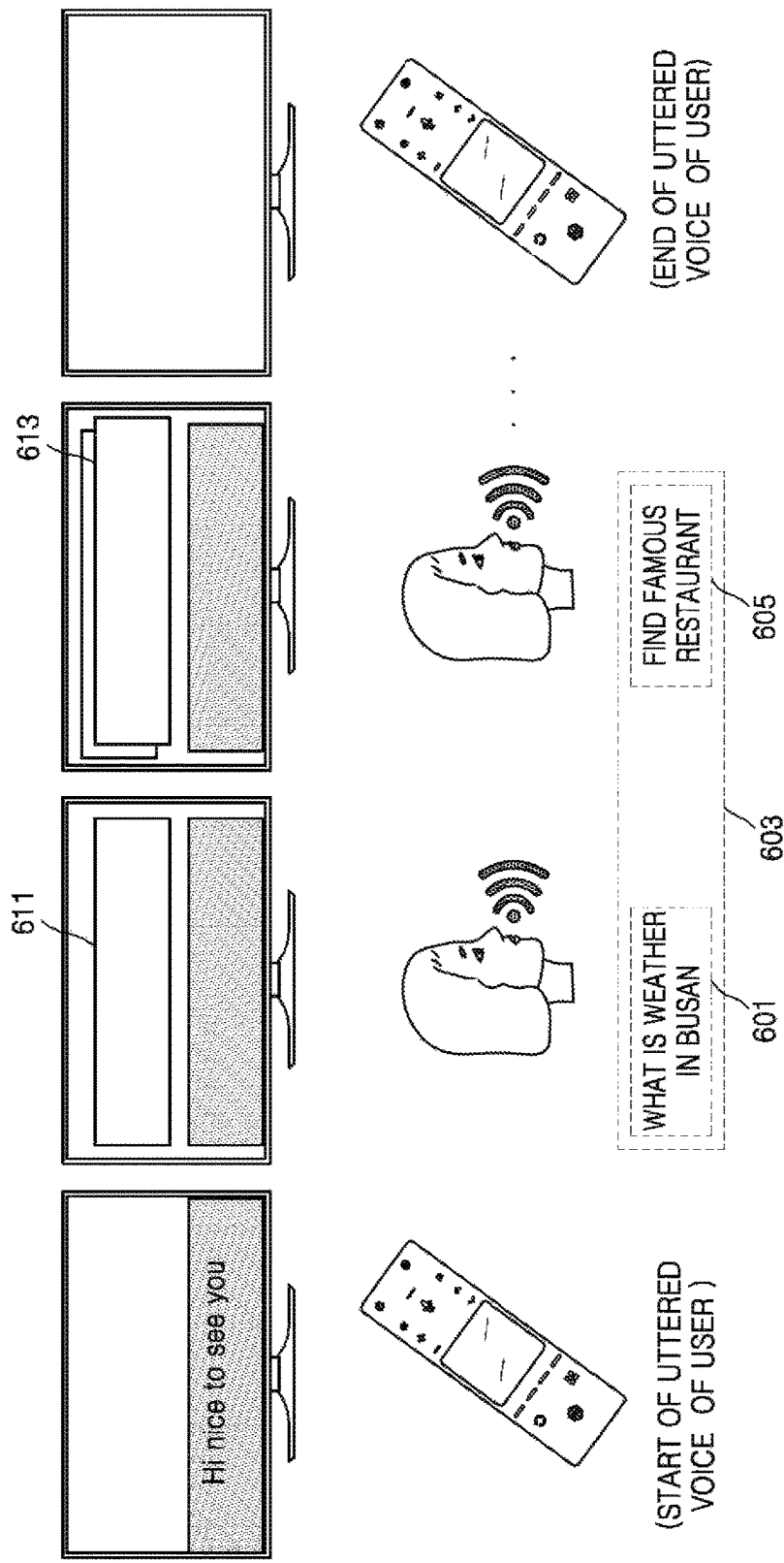
FIG. 6 is a diagram illustrating an example of the display apparatus performing an operation based on an intermediate recognition result according to an exemplary embodiment.

FIG. 6 is a diagram illustrating an example of the display apparatus 100 performing an operation based on an intermediate recognition result according to an exemplary embodiment.

FIG. 6 illustrates a case where the display apparatus 100 receives an uttered voice of a user corresponding to a plurality of commands.

For example, when a final result of an uttered voice of the user is "What is the weather in Busan and find a famous restaurant," the uttered voice of the user may correspond to a plurality of commands.

First, the display apparatus 100 may receive an uttered voice of the user corresponding to "What is the weather in Busan." The display apparatus 100 may determine first text 601 corresponding to the received uttered voice of the user as an intermediate recognition result.

Referring to FIG. 6, the display apparatus 100 may display at least one from among the first text 601 and a user interface 611 corresponding to a command determined based on the first text 601. The user interface 611 may include information about "the weather in Busan" provided by a weather information application or the like.

The display apparatus 100 may store the first text 601 that is the determined intermediate recognition result in a memory included in the display apparatus 100 or a memory of an external device.

The display apparatus 100 may additionally receive the uttered voice of the user corresponding to "find a famous restaurant." The display apparatus 100 may determine second text 603 corresponding to the received uttered voice of the user as an intermediate recognition result.

The display apparatus 100 may determine whether new text 605 is included in the determined intermediate recognition result by comparing the determined intermediate recognition result with the intermediate recognition result that was previously stored. For example, the intermediate recognition result that was previously stored may be "What is the weather in Busan," which is the first text 601. The determined intermediate recognition result may be "What is the weather in Busan and find a famous restaurant," which is the second text 603. In this case, the display apparatus 100 may determine that the determined intermediate recognition result includes "find a famous restaurant," which is the new text 605.

The display apparatus 100 may determine a command corresponding to the new text 605 based on an intention of the user. Also, the display apparatus 100 may determine the intention of the user based on the previous intermediate recognition result. When the new text 605 is "find a famous restaurant," the command corresponding to the new text 605 may be a command for finding a famous restaurant in "Busan" included in the first text 601, which is the previous intermediate recognition result.

Referring to FIG. 6, the display apparatus 100 may display at least one from among the second text 603 and a user interface 613 corresponding to the determined command. The user interface 613 may include information about "famous restaurants in Busan" provided by a search engine or the like. Also, the display apparatus 100 may display both the user interface 611 and the user interface 613.

According to an exemplary embodiment, when an uttered voice of the user corresponds to a plurality of commands, even before a final result is obtained, the display apparatus 100 may perform a plurality of operations according to the plurality of commands in real time according to the uttered voice of the user.

Figure 7:
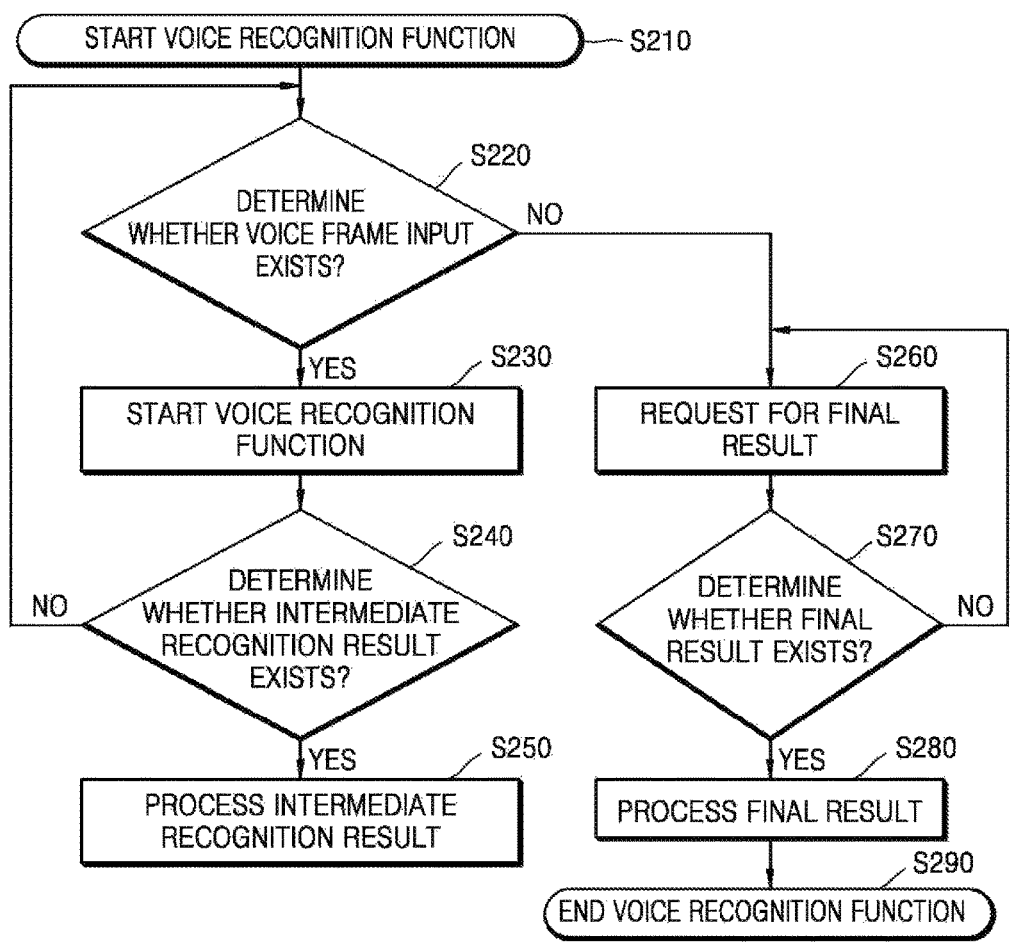
FIG. 7 is a flowchart of a method in which the display apparatus performs a voice recognition function according to an exemplary embodiment.

FIG. 7 is a flowchart of a method in which the display apparatus 100 performs a voice recognition function according to an exemplary embodiment.

In operation S210, the display apparatus 100 may start a voice recognition function. For example, the display apparatus 100 may receive an input for starting an uttered voice of a user.

In operation S220, the display apparatus 100 may determine whether a voice frame input exists.

When the display apparatus 100 determines in operation S220 that the voice frame input exists, the method proceeds to operation S230. In operation S230, the display apparatus 100 may perform a voice recognition function. The performing of the voice recognition function may include determining text corresponding to received uttered voice of the user as an intermediate recognition result.

When the display apparatus 100 determines in operation S220 that the voice frame input does not exist, the method proceeds to operation S260. In operation S260, the display apparatus 100 may request a final result.

In operation S240, the display apparatus 100 may determine whether the intermediate recognition result exists.

When the display apparatus 100 determines in operation S240 that the intermediate recognition result exists, the method proceeds to operation S250. In operation S250, the display apparatus 100 may process the intermediate recognition result. The processing of the intermediate recognition result may include determining a command corresponding to the intermediate recognition result and performing an operation corresponding to the command.

When the display apparatus 100 determines in operation S240 that the intermediate recognition result does not exist, the method returns to operation S220 in which the display apparatus 100 may determine whether a voice frame input exists.

In operation S270 the display apparatus 100 may determine whether the final result exists.

When the display apparatus 100 determines in operation S270 that the final result exists, the method proceeds to operation S280. In operation S280, the display apparatus 100 may process the final result.

When the display apparatus 100 determines in operation S270 that the final result does not exist, the method returns to operation S260 in which the display apparatus 100 may request a final result.

In operation S290, the display apparatus 100 may end the voice recognition function.

Figure 8:
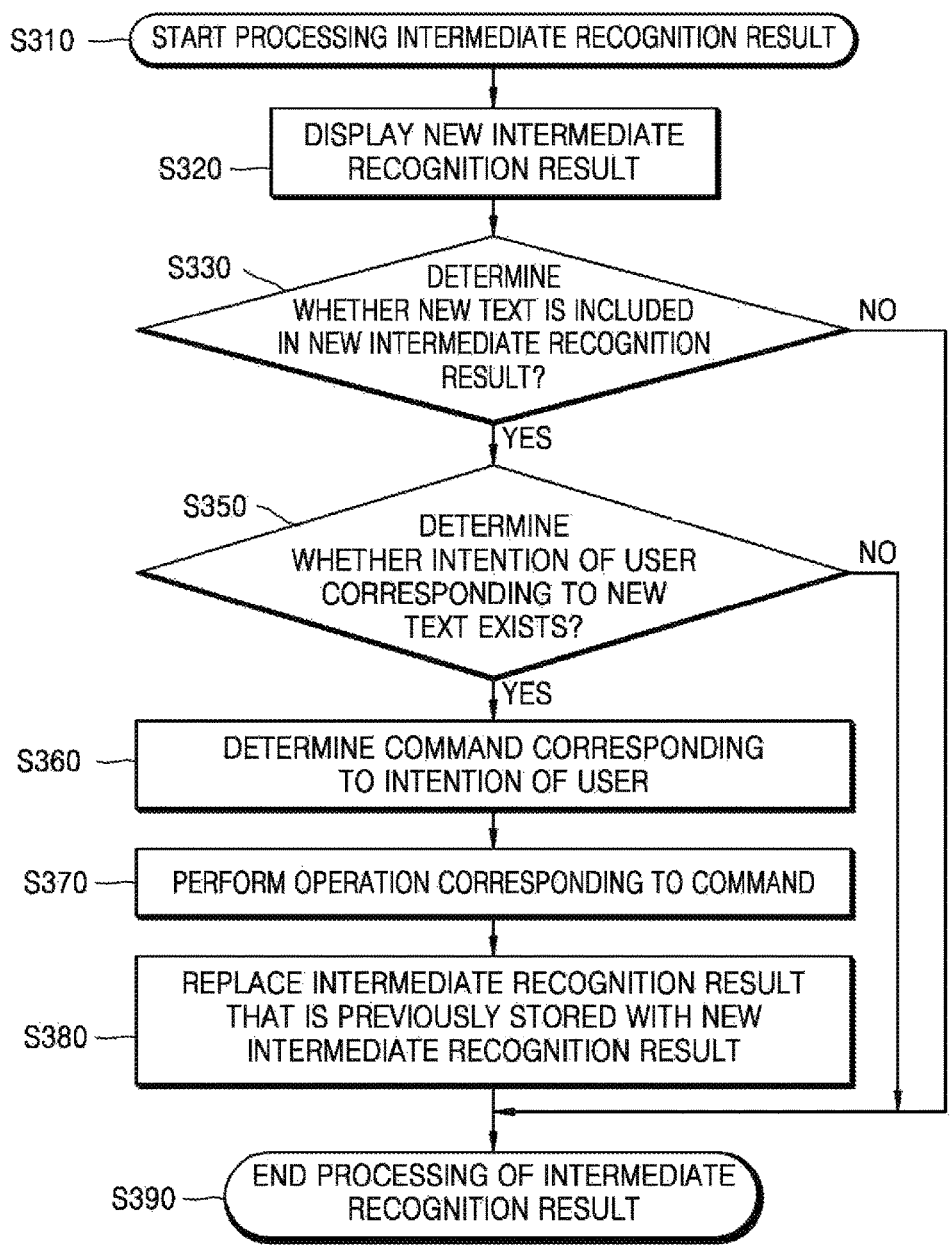
FIG. 8 is a flowchart of a method in which the display apparatus processes an intermediate recognition result according to an exemplary embodiment.

FIG. 8 is a flowchart of a method in which the display apparatus 100 processes an intermediate recognition result according to an exemplary embodiment.

A process performed by the display apparatus 100 to process an intermediate recognition result according to an exemplary embodiment may be included in operation S250 of FIG. 7.

In operation S310, the display apparatus 100 may start processing an intermediate recognition result.

In operation S320, the display apparatus 100 may display a new intermediate recognition result. The new intermediate recognition result may be based on an input of an uttered voice of a user received by the display apparatus 100 from a time when the uttered voice of the user starts to a time when the intermediate recognition result is processed.

For example, when the display apparatus 100 receives the uttered voice of the user corresponding to "Right down down," the display apparatus 100 may display "Right down down" that is an intermediate recognition result on a screen.

In operation S330, the display apparatus 100 may determine whether new text is included in the new intermediate recognition result.

For example, when a previous intermediate recognition result that was previously stored is "Right down" and the new intermediate recognition result is "Right down down," the new intermediate recognition result further includes "down" that is new text.

When the display apparatus 100 determines in operation S330 that the new intermediate recognition result includes the new text, the method proceeds to operation S350. In operation S350, the display apparatus 100 may determine whether an intention of the user corresponding to the new text exists.

According to an exemplary embodiment, the display apparatus 100 may determine whether the new text is included in a command list that was previously stored. For example, when "down," which is the new text, is included in the command list, the display apparatus 100 may determine that the intention of the user exists. The display apparatus 100 may recognize the intention of the user about the new text based on the previous intermediate recognition result that was previously stored.

When the display apparatus 100 determines in operation S330 that the new intermediate recognition result does not include the new text, the method proceeds to operation S390. In operation S390, the display apparatus 100 may end the processing of the intermediate recognition result.

When the display apparatus 100 determines in operation S350 that the intention of the user corresponding to the new text exists, the method proceeds to operation S360. In operation S360, the display apparatus 100 may determine a command based on the intention of the user.

For example, when the display apparatus 100 determines that the intention of the user corresponding to "down," which is the new text, exists, the display apparatus 100 may determine an instruction for moving a cursor downward based on the intention of the user as a command.

When the display apparatus 100 determines in operation S350 that no intention of the user exists, the method proceeds to operation S390. In operation S390, the display apparatus 100 may end the processing of the intermediate recognition result.

In operation S370, the display apparatus 100 may perform an operation corresponding to the command. For example, the display apparatus 100 may perform an operation of moving the cursor downward.

In operation S380, the display apparatus 100 may replace the previous intermediate recognition result that was previously stored with the new intermediate recognition result. For example, the display apparatus 100 may store "Right down down," which is the new intermediate recognition result, instead of "Right down," which is the previous intermediate recognition result that was previously stored. Accordingly, when the display apparatus 100 additionally receives an uttered voice of the user and processes a new intermediate recognition result, a previous intermediate recognition result that was previously stored may become "Right down down."

In operation S390, the display apparatus 100 may end the processing of the intermediate recognition result.

Figure 9:
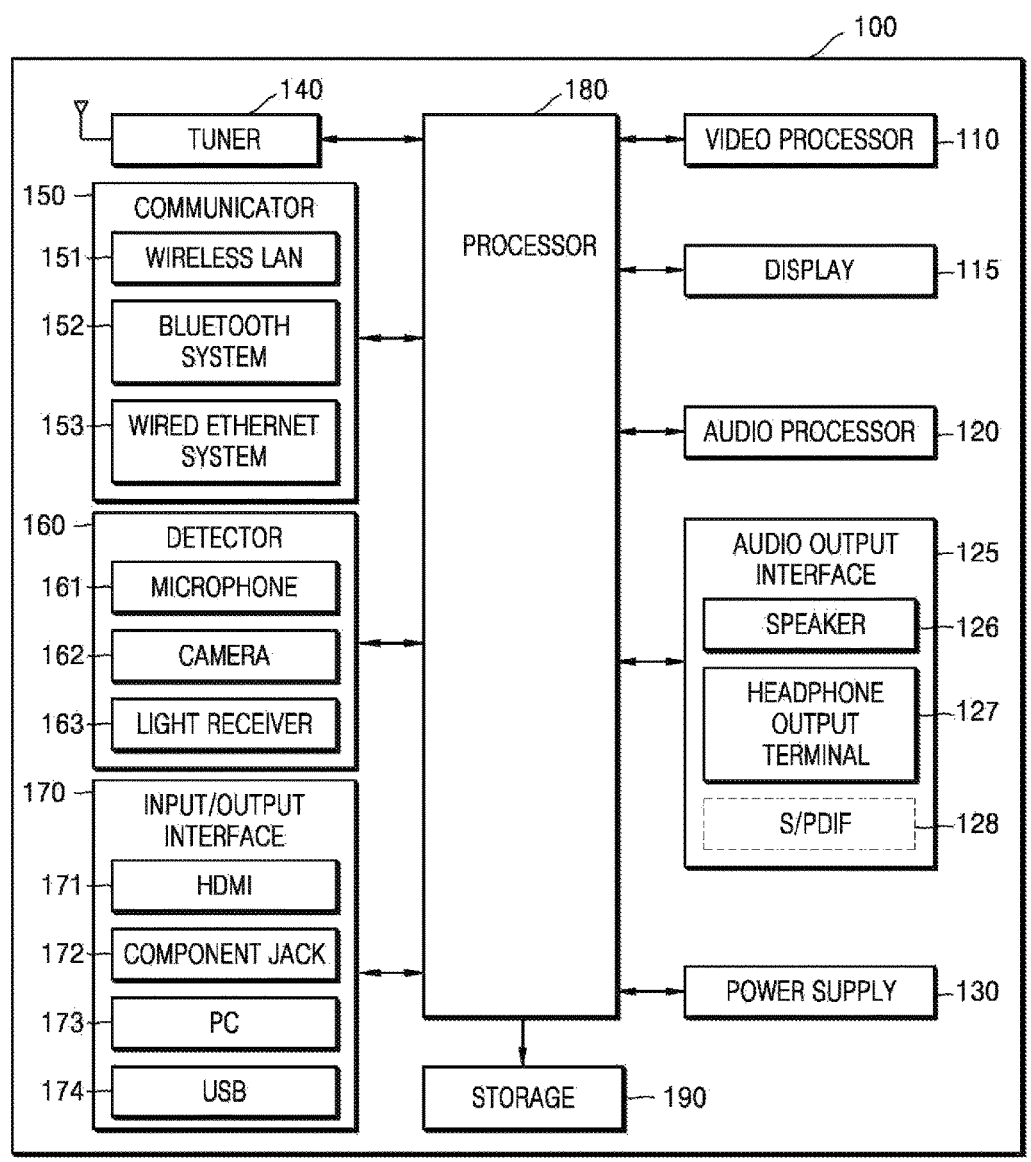
FIG. 9 is a block diagram illustrating a detailed configuration of the display apparatus according to an exemplary embodiment.

FIG. 9 is a block diagram illustrating a detailed configuration of the display apparatus 100 according to an exemplary embodiment.

Referring to FIG. 9, the display apparatus 100 includes a video processor 110, a display 115, an audio processor 120, an audio output interface 125, a power supply 130, a tuner 140, a communicator 150, a detector 160, an input/output interface 170, a processor 180, and a storage 190.

The video processor 110 processes video data received by the display apparatus 100. The video processor 110 may perform various types of image processing, such as decoding, scaling, noise filtering, frame rate transformation, or resolution transformation, on the video data.

The display 115 displays, on a screen, a video included in a broadcast signal received by the tuner 140 under the control of the processor 180. Also, the display 115 may display content (e.g., a moving picture) input through the input/output interface 170 or the communicator 150 under the control of the processor 180. The display 115 may output an image stored in the storage 190 under the control of the processor 180. Also, the display 150 may display a voice user interface (UI) (including a voice command guide) for performing a voice recognition task corresponding to voice recognition, a motion UI (including a voice command guide) for performing a motion recognition task corresponding to motion recognition, or a motion UI (including a user motion guide) for performing a motion recognition task corresponding to motion recognition.

The display 115 of FIG. 9 may include the display 30 of FIG. 1.

The audio processor 120 processes audio data. The audio processor 120 may perform various types of processing, such as decoding, amplification, or noise filtering, on the audio data. The audio processor 120 may include a plurality of audio processing modules to process audio corresponding to a plurality of pieces of content.

The audio output interface 125 outputs audio included in a broadcast signal received by the tuner 140 under the control of the processor 180. The audio output interface 125 may output audio (e.g., a voice or a sound) input through the input/output interface 170 or the communicator 150 under the control of the processor 180. Also, the audio output interface 125 may output audio stored in the storage 190 under the control of the processor 180. The audio output interface 125 may include at least one from among a speaker 126, a headphone output terminal 127, and a Sony/Philips digital interface (S/PDIF) output terminal 128. Alternatively, the audio output interface 125 may include a combination of the speaker 126, the headphone output terminal 127, and the S/PDIF output terminal 128.

The power supply 130 supplies power input from an external power supply to elements (i.e., 110 through 190) included in the display apparatus 100 under the control of the processor 180. Also, the power supply 130 may supply power output from one or more batteries provided in the display apparatus 100 to the elements 110 through 190 under the control of the processor 180.

The tuner 140 may tune and select only a frequency of a channel to be received by the display apparatus 100 from among many propagation components obtained by performing amplification, mixing, and resonance on a broadcast signal received by wire or wirelessly. The broadcast signal includes audio, video, and additional information (e.g., an electronic program guide (EPG)).

The tuner 140 may receive a broadcast signal in a frequency band corresponding to a channel number (e.g., a cable broadcast channel 506) according to a user input (e.g., a control signal received from the control device 200, for example, a channel number input, a channel up-down input, or a channel input on an EPG screen).

The tuner 140 may receive a broadcast signal from any of various sources such as a terrestrial broadcast source, a cable broadcast source, a satellite broadcast source, or an Internet broadcast source. The tuner 140 may receive a broadcast signal from a source such as analog broadcasting or digital broadcasting. The broadcast signal received by the tuner 140 is decoded by using, for example, audio decoding, video decoding, or additional information decoding, and is separated into audio, video, and/or additional information. The audio, the video, and/or the additional information may be stored in the storage 190 under the control of the processor 180.

The display apparatus 100 may include one or more tuners 140. According to an exemplary embodiment, when the display apparatus 100 includes a plurality of the tuners 140, the display apparatus 100 may output a plurality of broadcast signals may be output to a plurality of windows constituting a multi-window screen provided on the display 115.

The tuner 140 may be integrated into the display apparatus 100 in an all-in-one manner, or may be connected to a separate device (e.g., a set-top box) that is electrically connected to the display apparatus 100 or to the input/output interface 170.

The communicator 150 may connect the display apparatus 100 to an external device (e.g., an audio device) under the control of the processor 180. The processor 180 may transmit/receive content to/from the external device that is connected to the processor 180 through the communicator 150, may download an application from the external device, or may perform web browsing. The communicator 150 may include any one from among a wireless local area network (LAN) 151, a Bluetooth system 152, and a wired Ethernet system 153 according to a performance and a structure of the display apparatus 100. Alternatively, the communicator 150 may include a combination of the wireless LAN 151, the Bluetooth system 152, and the wired Ethernet system 153. The communicator 150 may receive a control signal of the control device 200 under the control of the processor 180. The control signal may be, for example, a Bluetooth signal, a radio frequency (RF) signal, or a WiFi signal.

The communicator 150 may further include a short-range communication system (e.g., a near-field communication (NFC) system or a Bluetooth low energy (BLE) system) other than the Bluetooth system 152.

The communicator 150 may include the communicator 50 of the display apparatus 100 of FIG. 2.

The detector 160 detects an uttered voice of a user, an image of the user, or an interaction of the user.

A microphone 161 receives an uttered voice of the user. The microphone 161 may convert the received uttered voice into an electrical signal and may output the electrical signal to the processor 180. The uttered voice of the user may include, for example, a voice corresponding to a menu or a function of the display apparatus 100. A recommended recognition range of the microphone 161 may be, for example, about 4 meters (m) between the microphone 161 to a position of the user, and may vary according to a voice tone of the user and an ambient environment (e.g., a speaker sound or an ambient noise).

The microphone 161 may be integrated into or separated from the display apparatus 100. When the microphone 161 is separated from the display apparatus 100, the microphone 161 may be electrically connected to the display apparatus 100 through the communicator 150 or the input/output interface 170.

The detector 160 may include the user input interface 40 of the display apparatus 100 of FIG. 2.

A camera 162 captures an image (e.g., continuous frames) corresponding to a motion of the user including a gesture in a recognition range. For example, the recognition range of the camera 162 may be about 0.1 m to about 5 m between the camera 162 and a position of the user. The motion of the user may include a motion of a body part or a region of the user such as the face, facial expression, hand, fist, or finger of the user. The camera 162 may convert the received image into an electrical signal and may output the electrical signal to the processor 180 under the control of the processor 180. The processor 180 may select a menu displayed on the display apparatus 100 by using a result of motion recognition or may perform control corresponding to the result of motion recognition. For example, the processor 180 may adjust a volume or move a cursor.

The camera 162 may include a lens and an image sensor. The camera 162 may support optical zooming or digital zooming by using a plurality of lenses and image processing. A recognition range of the camera 162 may be set to vary according to an angle of a camera and an ambient environment condition. When the camera 162 includes a plurality of cameras, the camera 162 may receive 3D still images or 3D moving images by using the plurality of cameras.

The camera 162 may be integrated into or separated from the display apparatus 100. When the camera 162 is separated from the display apparatus 100, an additional device including the camera 162 may be electrically connected to the display apparatus 100 through the communicator 150 or the input/output interface 170.

It will be understood by one of ordinary skill in the art that the camera 162 may be omitted according to a performance and a structure of the display apparatus 100.

A light receiver 163 receives an optical signal (including a control signal) that is received from the control device 200 that is outside the light receiver 163 through a light window or the like in a bezel of the display 115. The light receiver 163 may receive an optical signal corresponding to a user input (e.g., a touch, a push, a touch gesture, a voice, or a motion) from the control device 200. The control signal may be extracted from the received optical signal under the control of the processor 180.

It will be understood by one of ordinary skill in the art that the light receiver 163 may be omitted according to a performance and a structure of the display apparatus 100.

The input/output interface 170 receives video (e.g., a moving picture), audio (e.g., a voice or music), and additional information (e.g., an EPG) from the outside of the display apparatus 100 under the control of the processor 180. The input/output interface 170 may include at least one from among a high-definition multimedia interface (HDMI) port 171, a component jack 172, a PC port 173, and a universal serial bus (USB) port 174. Alternatively, the input/output interface 170 may further include at least one from among a D-sub port, a digital visual interface (DVI) port, and a DP port according to an exemplary embodiment.

It will be understood by one of ordinary skill in the art that the input/output interface 170 may be configured and operate in various ways according to an exemplary embodiment.

The processor 180 controls an overall operation of the display apparatus 100 and signal transmission/reception between the elements 110 through 190 of the display apparatus 100, and processes data. When a user input occurs or satisfies a condition that was previously set and stored, the processor 180 may execute an operating system (OS) and various applications that are stored in the storage 190.

The processor 180 may include a graphics processing unit (GPU) for performing graphics processing on a video. The processor 180 may be provided as a system-on-chip (SoC) in which a core is combined with a GPU.

The processor 180 of FIG. 9 may perform all of functions of the processor 20 of FIGS. 1 and 2.

The storage 190 may store various data, programs, or applications for driving and controlling the display apparatus 100 under the control of the processor 182. The storage 190 may store signals or data that are input/output according to operations of the video processor 110, the display 115, the audio processor 120, the audio output interface 125, the power supply 130, the communicator 150, the detector 160, the input/output interface 170, and the user input interface 175.

The storage 190 may store a control program for controlling the display apparatus 100 and the processor 180, a presentation module for configuring a display screen, and an application downloaded from the outside or initially provided by a manufacturer. For example, the storage 190 may store a resource such as a JavaScript file or an XML file used in the application.

The storage 190 may include a presentation module. The presentation module is a module for configuring a display screen. The presentation module includes a multimedia module for reproducing and outputting multimedia content and a user interface (UI) rendering module for performing a UI and graphics processing. Examples of the multimedia module may include a player module, a camcorder module, and a sound processing module. Accordingly, the multimedia module produces and reproduces a screen image and a sound by reproducing various multimedia content. The UI rendering module may include an image composition module for composes an image, a coordinate combination module for combining and generating coordinates on a screen on which an image is to be displayed, an X Window System (X11) module for receiving various events from hardware, and a two-dimensional (2D)/3D UI toolkit for providing a tool for constructing a 2D or 3D UI.

Also, the storage 190 may store a graphical user interface (GUI) related to an application, an object (e.g., an image, text, an icon, or a button) for providing the GUI, user information, a document, databases, or related data. Also, the storage 190 may store an OS that is executed when the display apparatus 100 is turned on. Also, the storage 190 may store a resident program (i.e., daemon) of the display apparatus 100. Also, a digital rights management (DRM) decryption module for decrypting a DRM of an application executed in the display apparatus 100 may be stored in the storage 190.

The term "storage" according to an exemplary embodiment includes the storage 190, a read-only memory (ROM) in which a control program for controlling the display apparatus 100 is stored, a random-access memory (RAM) in which a signal or data input from the outside is stored or that is used as a storage area corresponding to any of various operations performed by the display apparatus 100, or a memory card (e.g., a micro secure digital (SD) card or a USB memory) mounted in the display apparatus 100. Also, the storage 190 may include a nonvolatile memory, a volatile memory, a flash memory, a hard disk drive (HDD), or a solid-state drive (SSD).

The storage 190 may include a volume control module, a communication control module, a voice recognition module, a motion recognition module, a light reception module, a display control module, an audio control module, an external input control module, a power supply control module, a power supply control module of an external device that is connected through wireless communication (e.g., Bluetooth), a voice database (DB), or a motion DB. The modules and the DBs of the storage 190 may be implemented as software in order the display apparatus 100 to perform functions of volume control, communication control, voice recognition, motion recognition, light reception control, audio control, external input control, power supply control, and display control for controlling a cursor to be displayed. The processor 180 may perform each function by using the software stored in the storage 190.

Also, the storage 190 of FIG. 9 may include the memory 10 of FIG. 1.

The display apparatus 100 may be electrically connected to an external device (e.g., a set-top box) including a tuner. For example, it will be understood by one of ordinary skill in the art that the display apparatus 100 may be, but is not limited to, an analog TV, a digital TV, a 3D-TV, a smart TV, an LED TV, an OLED TV, a plasma TV, or a monitor.

The display apparatus 100 may include a sensor (e.g., an illuminance sensor or a temperature sensor) for detecting an internal or external state of the display apparatus 100.

At least one element may be added to or omitted from among the elements (e.g., 110 through 190) of the display apparatus 100 of FIG. 9 according to a performance of the display apparatus 100. Also, it will be understood by one of ordinary skill in the art that positions of the elements (e.g., 110 through 190) may vary according to a performance or a structure of the display apparatus 100.

Figure 10:
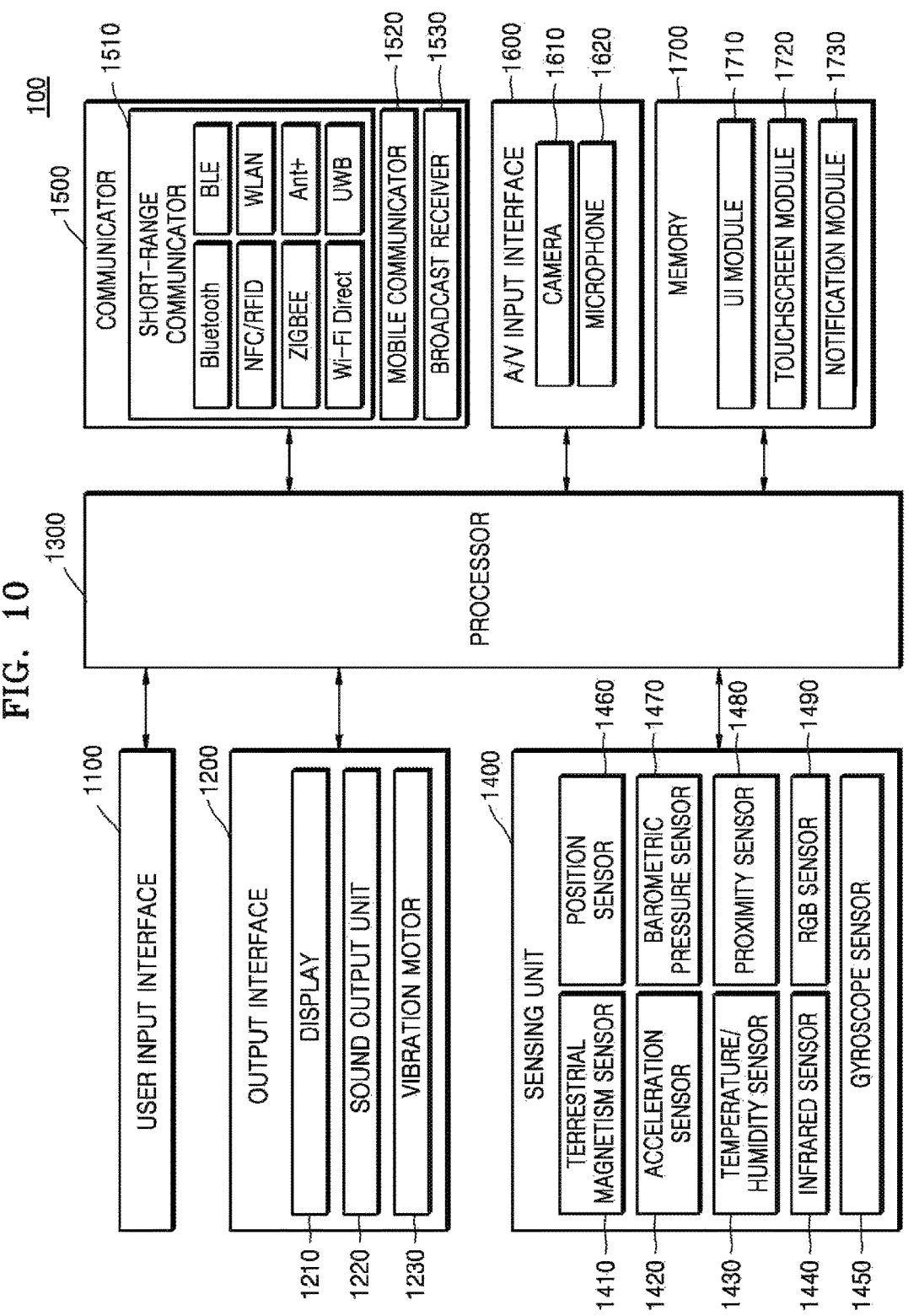
FIG. 10 is a block diagram of the display apparatus according to an exemplary embodiment.

FIG. 10 is a block diagram of the display apparatus 100 according to an exemplary embodiment.

For example, as shown in FIG. 10, the display apparatus 100 according to an exemplary embodiment may further include a sensing unit 1400, an audio/video (A/V) input interface 1600, and a memory 1700, in addition to a user input interface 1100, an output interface 1200, a controller 1300, and a communicator 1500.

The user input interface 1100 is an interface through which a user inputs data for controlling the display apparatus 100. Examples of the user input interface 1100 may include, but are not limited to, a keypad, a dome switch, a touchpad (e.g., a contact-type capacitance method, a pressure-type resistance film method, an infrared sensing method, a surface ultrasound transmission method, an integral tension measuring method, or a piezoelectric effect method), a jog wheel, and a jog switch.

The user input interface 1100 may receive a password from the user. The user input interface 1100 may also receive an input about a type of the password to be received from the user.

The output interface 1200 may output an audio signal, a video signal, or a vibration signal, and may include a display 1210, a sound output interface 1220, and a vibration motor 1230.

The display 1210 displays and outputs information processed by the display apparatus 100.

When the display 1210 and a touchpad have a structure to form a touchscreen, the display 1210 may be used as an input device in addition to an output device. The display 1210 may include at least one from among an LCD, a thin-film transistor liquid-crystal display, an OLED, a flexible display, a 3D display, and an electrophoretic display. According to a type of the display apparatus 100, the display apparatus 100 may include two or more displays 1210. In this case, the two or more displays 1310 may face each other by being connected to each other via a hinge.

The display 1210 of FIG. 10 may include the display 30 of FIG. 1.

The sound output interface 1220 outputs audio data received from the communicator 1500 or stored in the memory 1700. Also, the sound output interface 1220 outputs a sound signal (e.g., a call signal receiving sound, a message receiving sound, or a notification sound) related to a function performed by the display apparatus 100. A speaker or a buzzer may be included in the sound output interface 1220.

The vibration motor 1230 may output a vibration signal. For example, the vibration motor 1230 may output a vibration signal corresponding to an output of audio data or video data (e.g., a call signal receiving sound or a message receiving sound). Also, the vibration motor 1230 may output a vibration signal when a touch is input to a touchscreen.

The controller 1300 controls an overall operation of the display apparatus 100. For example, the controller 1300 may control the user input interface 1100, the output interface 1200, the sensing unit 1400, the communicator 1500, and the A/V input interface 1600 by executing programs stored in the memory 1700.

The controller 1300 of FIG. 10 may include the processor 20 of FIG. 1.

The sensing unit 1400 may detect a state of the display apparatus 100 or a state around the display apparatus 100 and may transmit information about the state to the controller 1300.

The sensing unit 1400 may include at least one from among, but not limited to, a terrestrial magnetism sensor 1410, an acceleration sensor 1420, a temperature/humidity sensor 1430, an infrared sensor 1440, a gyroscope sensor 1450, a position sensor (e.g., a global positioning system (GPS)) 1460, a barometric pressure sensor 1470, a proximity sensor 1480, and an RGB sensor (e.g., an illuminance sensor) 1490. Functions of the sensors would have been intuitively derived by one of ordinary skill in the art from their names, and thus a detailed explanation thereof will not be given.

The communicator 1500 may include one or more elements through which the display apparatus 100 communicates with an external device or a server. For example, the communicator 1500 may include a short-range communicator 1510, a mobile communicator 1520, and a broadcast receiver 1530.

Examples of the short-range communicator 151 may include, but are not limited to, a Bluetooth communicator, a Bluetooth low energy (BLE) communicator, a near field communicator, a WLAN (WiFi) communicator, a Zigbee communicator, an infrared data association (IrDA) communicator, a WiFi Direct (WFD) communicator, an ultra-wideband (UWB) communicator, and an Ant+ communicator.

The mobile communicator 1520 transmits/receives a wireless signal to/from at least one from among a base station, an external terminal, and a server via a mobile communication network. Examples of the wireless signal may include a voice call signal, a video call signal, and any of various pieces of data according to text/multimedia message transmission/reception.

The broadcast receiver 1530 receives a broadcast signal and/or broadcast-related information from the outside through a broadcast channel. Examples of the broadcast channel may include a satellite channel and a terrestrial channel. According to an exemplary embodiment, the display apparatus 100 may not include the broadcast receiver 1530.

Also, the communicator 1500 may transmit/receive data needed to provide a hint by using biological information of the user to an external device of the user or a server.

The communicator 1500 of FIG. 10 may include the communicator 50 of the display apparatus 100 of FIG. 2.

The A/V input interface 1600 for inputting an audio signal or a video signal may include a camera 1610 and a microphone 1620. The camera 1610 may obtain image frames such as a still image or a moving image by using an imaging device in a video mode or an imaging mode. An image captured by the imaging device may be processed by the controller 1300 or an additional image processor.

The image frames processed by the camera 1610 may be stored in the memory 1700 or may be transmitted to the outside through the communicator 1500. Two or more cameras 1610 may be provided according to a configuration of a terminal.

The microphone 1620 receives an external sound signal and processes the external sound signal into electrical voice data. For example, the microphone 1620 may receive a sound signal from an external device or a speaker. The microphone 1620 may use any of various noise removing algorithms to remove noise occurring when receiving an external sound signal.

The A/V input interface 1600 may include the user input interface 40 of the display apparatus 100 of FIG. 2.

The memory 1700 may store a program for processing and controlling the controller 1300, and may store data input to the display apparatus 100 or output from the display apparatus 100.

The memory 1700 may include at least one type of storage medium from among a flash memory type, a hard disk type, a multimedia card micro type, a card type memory (e.g., an SD or XD memory), a RAM, a static random-access memory (SRAM), a ROM, an electrically erasable programmable read-only memory (EEPROM), a programmable read-only memory (PROM), a magnetic memory, a magnetic disk, and an optical disk.

Programs stored in the memory 1700 may be classified into a plurality of modules according to functions of the memory 1700. For example, the memory 1700 may include a UI module 1710, a touchscreen module 1720, and a notification module 1730.

The memory 1700 of FIG. 10 may include the memory 10 of FIG. 1.

The UI module 1710 may provide a specialized UI or a GUI that interoperates with the display apparatus 100 according to an application. The touchscreen module 1720 may detect a touch gesture on a touchscreen of the user, and may transmit information about the touch gesture to the controller 1300. The touchscreen module 1720 according to an exemplary embodiment may recognize and analyze a touch code. The touchscreen module 1720 may be configured as separate hardware including a controller.

Various sensors may be located in or near the touchscreen in order to detect a touch or a proximity touch of the touchscreen. An example of a sensor for detecting a touch of the touchscreen may be a tactile sensor. The tactile sensor refers to a sensor that detects a contact of a specific object to a degree that a person feels or a higher degree. The tactile sensor may detect any of various information such as a roughness of a contact surface, a rigidity of a contact object, or a temperature of a contact point.

Also, an example of a sensor for detecting a touch of the touchscreen may be a proximity sensor. The proximity sensor refers to a sensor that detects an object that is approaching a predetermined detection surface or a neighboring object by using the strength of an electromagnetic field or infrared rays without a mechanical contact. Examples of the proximity sensor may include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor. Examples of the touch gesture of the user may include a tap, a touch and hold, a double-tab, a drag, a panning, a flick, a drag and drop, and a swipe.

The notification module 1730 may generate a signal for notifying of an event occurring in the display apparatus 100. Examples of the event occurring in the display apparatus 100 may include call signal reception, message reception, key signal input, and schedule notification. The notification module 1730 may output a notification signal as a video signal through the display 1210, may output a notification signal as an audio signal through the sound output interface 1220, or may output a notification signal as a vibration signal through the vibration motor 1230.

Figure 11:
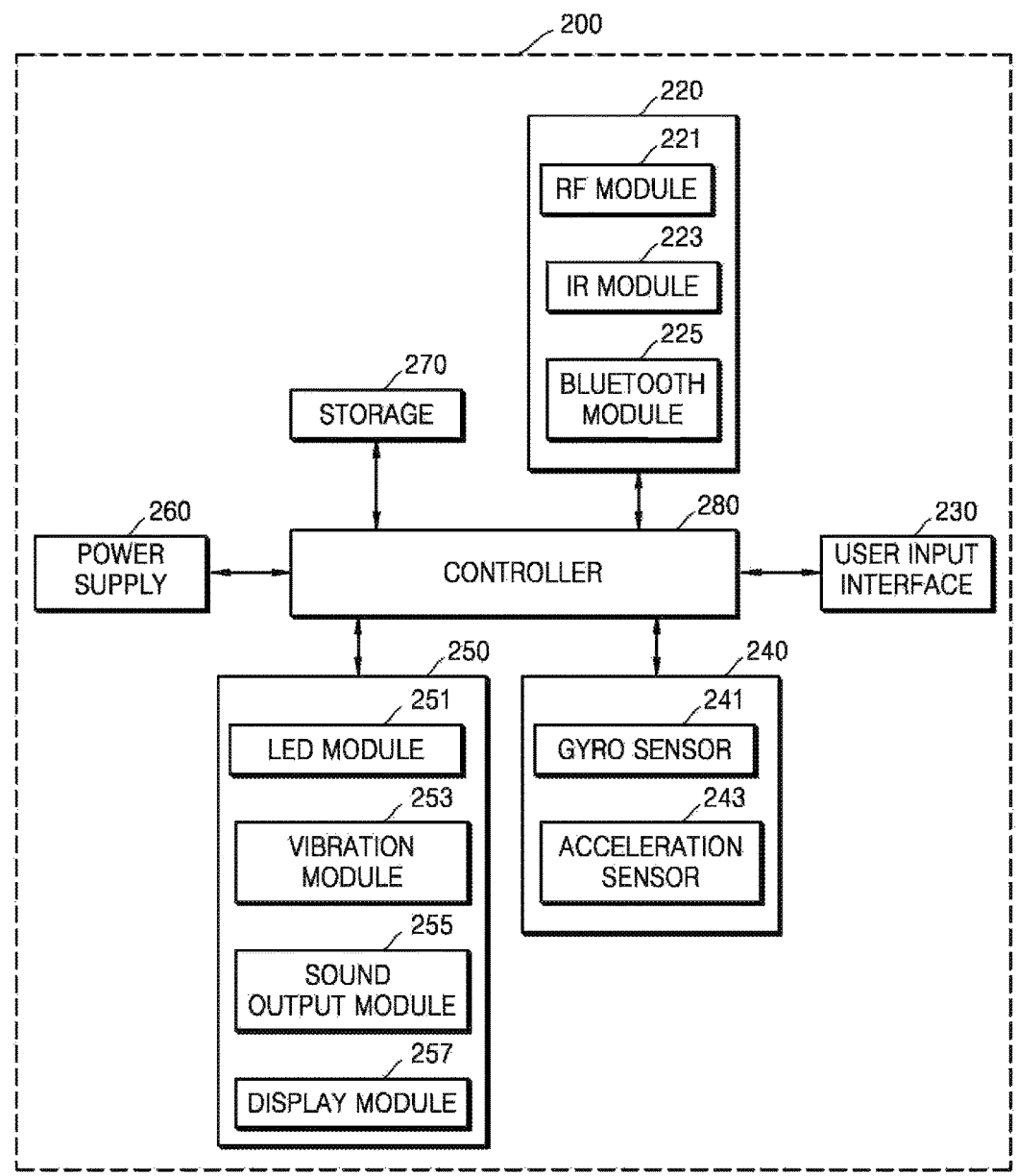
FIG. 11 is a block diagram illustrating a configuration of the control device according to an exemplary embodiment.

FIG. 11 is a block diagram illustrating a configuration of the control device 200 according to an exemplary embodiment.

Referring to FIG. 11, the control device 200 may include a wireless communicator 220, a user input interface 230, a sensing interface 240, an output interface 250, a power supply 260, a storage 270, and a controller 280.

The wireless communicator 220 may transmit/receive a signal to/from the display apparatus 100 according to the above exemplary embodiments. The wireless communicator 220 may include an RF module 221 for transmitting/receiving a signal to/from the display apparatus 100 according to an RF communication standard. Also, the control device 200 may include an infrared (IR) module 223 for transmitting/receiving a signal to/from the display apparatus 100 according to an IR communication standard. Also, the wireless communicator 220 may include a Bluetooth module 225 for transmitting/receiving a Bluetooth signal to/from the display apparatus 100.

The wireless communicator 220 may include the communicator 203 of the control device 200 of FIG. 2.

In the present exemplary embodiment, the control device 200 transmits a signal containing information about a motion and the like of the control device 200 to the display apparatus 100 through the RF module 221.

Also, the control device 200 may receive a signal transmitted by the display apparatus 100 through the RF module 221. Also, the control device 200 may transmit a command for turning power on/off, changing a channel, or changing a volume to the display apparatus 100 through the IR module 223, if necessary.

The user input interface 230 may include a keypad, a button, a touchpad, or a touchscreen. A user may input a command related to the display apparatus 100 to the control device 200 by manipulating the user input interface 230. When the user input interface 230 includes a hard key button, the user may input a command related to the display apparatus 100 to the control device 200 by pushing the hard key button. When the user input interface 230 includes a touchscreen, the user may input a command related to the display apparatus 100 to the control device 200 by touching a soft key of the touchscreen.

The user input interface 230 may include any of various input interfaces that may be manipulated by the user, for example, a scroll key or a jog key. Also, the user input interface 230 may include a microphone that may receive a voice of the user.

The user input interface 230 may include the user input interface 201 of the control device 200 of FIG. 2.

The sensing interface 240 may include a gyro sensor 241 or an acceleration sensor 243. The gyro sensor 241 may sense information about a motion of the control device 200. For example, the gyro sensor 241 may sense information about an operation of the control device 200 with respect to x, y, and z-axes. The acceleration sensor 243 may sense information about a movement speed of the control device 200. The sensing interface 240 may further include a distance sensor, and thus may sense a distance between the display apparatus 100 and the control device 200 by using the distance measurement sensor.

The output interface 250 may output an image signal or an audio signal corresponding to a manipulation of the user input interface 230 or a signal received by the display apparatus 100. The user may recognize whether the user input interface 230 is manipulated or whether the display apparatus 100 is controlled, through the output interface 250.

For example, the output interface 250 may include an LED module 251, a vibration module 253, a sound output module 255, and a display module 257, which respectively emit light, vibrate, output a sound, and output an image when the user input interface 230 is manipulated or a signal is transmitted/received to/from the display apparatus 100 through the wireless communicator 220.

The power supply 260 supplies power to the control device 200. The power supply 260 may reduce excessive power consumption by not supplying power when the control device 200 does not move for a predetermined period of time. The power supply 260 may supply power again when a predetermined key provided in the control device 200 is manipulated.

The storage 270 may store various programs and application data needed to control or operate the control device 200.

The controller 280 controls overall operations related to control of the control device 200. The controller 280 may transmit a signal corresponding to a manipulation of a predetermined key of the user input interface 230 or a signal corresponding to a motion of the control device 200 sensed by the sensing interface 240 to the display apparatus 100 through the communicator 220.

A coordinate value calculator may calculate coordinates (x, y) of a cursor to be displayed on the display 115 of the display apparatus 100 by correcting hand shaking or errors from a signal corresponding to a detected operation of the control device 200.

According to the one or more exemplary embodiments, when an operation of a display apparatus is to be controlled based on an uttered voice of a user, the display apparatus may perform an operation according to an intention of the user in real time even before the user voice of the user ends.

According to the one or more exemplary embodiments, when a display apparatus is to repeatedly perform an operation based on an uttered voice of a user, the display apparatus may be easily controlled by using only the uttered voice of the user even without repeated inputs for starting or ending a voice recognition function.

A control method according to an exemplary embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for exemplary embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a RAM, or a flash memory. Examples of the program commands are advanced language codes that may be executed by a computer by using an interpreter or the like as well as machine language codes made by a compiler.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display;
a memory; and
a processor configured to:
based on a first uttered voice of a user being received, store, in the memory, a first intermediate recognition result corresponding to the first uttered voice;
identify a first command corresponding to the first intermediate recognition result;
based on a second uttered voice of the user being received after the receiving of the first uttered voice, store, in the memory, a second intermediate recognition result corresponding to the second uttered voice;
based on a new text being included in the second intermediate recognition result by comparing the second intermediate recognition result with the first intermediate recognition result, identify a second command corresponding to the new text; and
perform a first operation according to the first command and a second operation according to the second command,
wherein each of the first intermediate recognition result and the second intermediate recognition result comprises at least one word.

2. The display apparatus of claim 1, wherein the processor is further configured to:
identify whether an intention of the user corresponding to the new text exists, and
based on the processor identifying that the intention of the user exists, identify the second command based on the intention of the user.

3. The display apparatus of claim 2, wherein based on the intention of the user corresponding to the new text being identical to an intention of the user corresponding to the first intermediate recognition result, the first command is the same as the second command.

4. The display apparatus of claim 2, wherein the processor is further configured to, based on identifying the intention of the user exists, store the second intermediate recognition result in the memory.

5. The display apparatus of claim 1, wherein the processor is further configured to control the display to display a user interface corresponding to the second command on the display,
wherein the user interface corresponding to the second command comprises at least one from among the second intermediate recognition result and the new text corresponding to the second command.

6. The display apparatus of claim 1, wherein the processor is further configured to:
identify whether the second uttered voice of the user ends, and
based on identifying that the second uttered voice of the user ends, identify the second intermediate recognition result as a final result.

7. The display apparatus of claim 1, wherein the processor is further configured to:
identify whether the second uttered voice of the user ends, and
based on identifying that the second uttered voice of the user ends, end the receiving of the second uttered voice of the user.

8. The display apparatus of claim 1, wherein the identified first command comprises any one from among a command for adjusting a position of a cursor displayed on the display, a command for adjusting a volume of a sound output interface included in the display apparatus, and a command for changing a channel of the display apparatus.

9. The display apparatus of claim 1, wherein the first intermediate recognition result stored in the memory corresponds to the first uttered voice of the user received from a time when the processor receives an input to start a function for recognizing the first uttered voice of the user to a time when an intention of the user is recognized.

10. A method of controlling a display apparatus, the method comprising:
based on a first uttered voice of a user being received, storing, in a memory, a first intermediate recognition result corresponding to the first uttered voice;
identifying a first command corresponding to the first intermediate recognition result;
based on a second uttered voice of the user being received after the receiving of the first uttered voice, storing, in the memory, a second intermediate recognition result corresponding to the second uttered voice;
based on a new text being included in the second intermediate recognition result by comparing the second intermediate recognition result with the first intermediate recognition result, identifying a second command corresponding to the new text; and
performing a first operation according to the first command and a second operation according to the second command,
wherein each of the first intermediate recognition result and the second intermediate recognition result comprises at least one word.

11. The method of claim 10, wherein the identifying the second command corresponding to the new text comprises:
identifying whether an intention of the user corresponding to the new text exists; and
based on identifying that the intention of the user exists, identifying the second command based on the intention of the user.

12. The method of claim 11, wherein based on the intention of the user corresponding to the new text being identical to an intention of the user corresponding to the first intermediate recognition result, the first command is the same as the second command.

13. The method of claim 11, further comprising, based on identifying that the intention of the user exists, storing the second intermediate recognition result in a memory.

14. The method of claim 10, further comprising displaying a user interface corresponding to the second command,
wherein the user interface corresponding to the second command comprises at least one from among the second intermediate recognition result and the new text corresponding to the second command.

15. The method of claim 10, further comprising:
identifying whether the second uttered voice of the user ends; and
based on identifying that the second uttered voice of the user ends, identifying the second intermediate recognition result as a final result.

16. The method of claim 10, further comprising:
identifying whether the second uttered voice of the user ends; and
based on identifying that the second uttered voice of the user ends, ending the receiving of the second uttered voice of the user.

17. The method of claim 10, wherein the identified first command comprises any one from among a command for adjusting a position of a cursor displayed on a display, a command for adjusting a volume of a sound output interface included in the display apparatus, and a command for changing a channel of the display apparatus.

18. A non-transitory computer-readable storage medium having embodied thereon a program which is executable by a computer to perform the method of claim 10.

* * * * *